W. C. MATTESON.
TRACK SUPPORTING FRAME FOR TRACTORS.
APPLICATION FILED NOV. 25, 1919.

1,411,448. Patented Apr. 4, 1922.
2 SHEETS—SHEET 1.

INVENTOR.
W. C. Matteson
BY
ATTORNEY

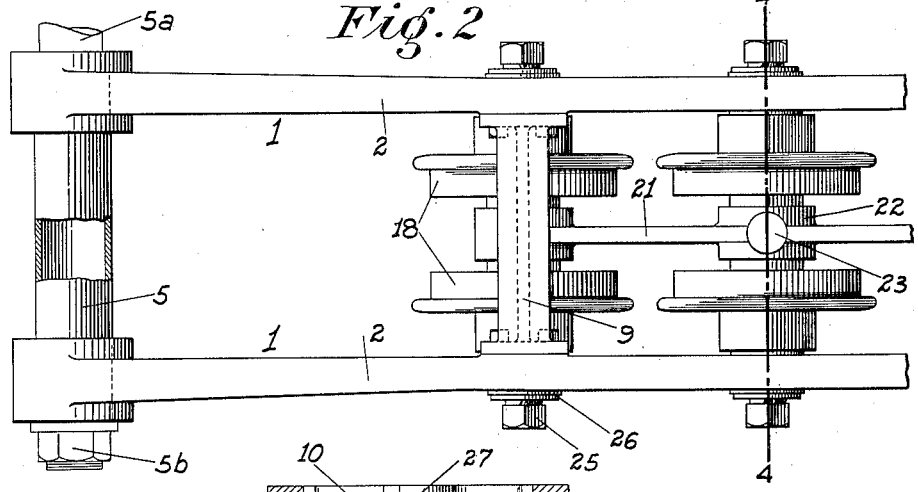
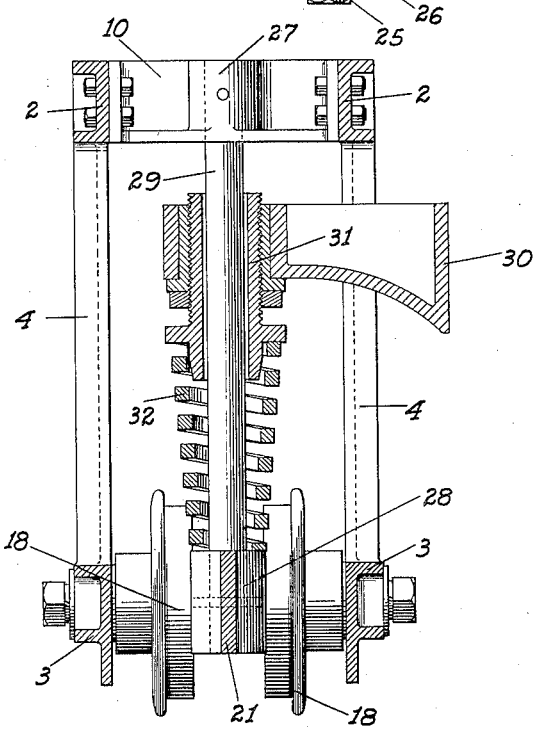
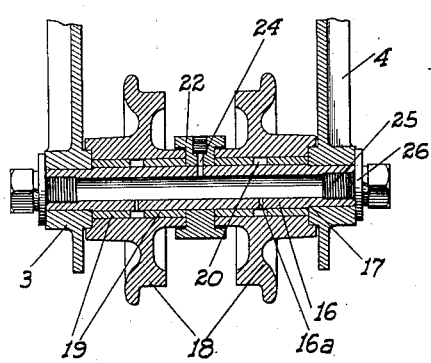

UNITED STATES PATENT OFFICE.

WALTER C. MATTESON, OF STOCKTON, CALIFORNIA.

TRACK-SUPPORTING FRAME FOR TRACTORS.

1,411,448.  Specification of Letters Patent.  Patented Apr. 4, 1922.

Application filed November 25, 1919. Serial No. 340,493.

*To all whom it may concern:*

Be it known that I, WALTER C. MATTESON, a citizen of the United States, residing at Stockton, county of San Joaquin, State of California, have invented certain new and useful Improvements in Track-Supporting Frames for Tractors; and I do declare the following to be a full, clear, and exact description of the same, reference being had to the accompanying drawings and to the characters of reference marked thereon, which form a part of this application.

This invention relates to improvements in a track and track-wheel supporting frame for tractors, the principal object of the invention being to devise such a frame as may be constructed of very few parts, and which will have a maximum of rigidity with a minimum of weight.

A further object is to provide a frame for the purpose which will be entirely independent of the main body of the tractor and which may be removed therefrom without dismantling the tractor should it be desired to use the ordinary form of wheels thereon instead of the endless track.

Another object is to provide a flexible connecting means between the frame and the body of the tractor constructed in such a manner that while the track frame is intended and best adapted for use with a pilot wheel or truck being mounted to the tractor, this latter wheel may be removed if conditions warrant, and the entire weight of the tractor carried by the track mounted on the frame.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 2 is an enlarged top plan view of a portion of the frame.

Fig. 3 is a cross section of the same, taken through the connecting device of the frame with the tractor body.

Fig. 4 is a cross section of the track supporting rollers mounted in the frame, taken on a line 4—4 of Fig. 2.

Figure 1:
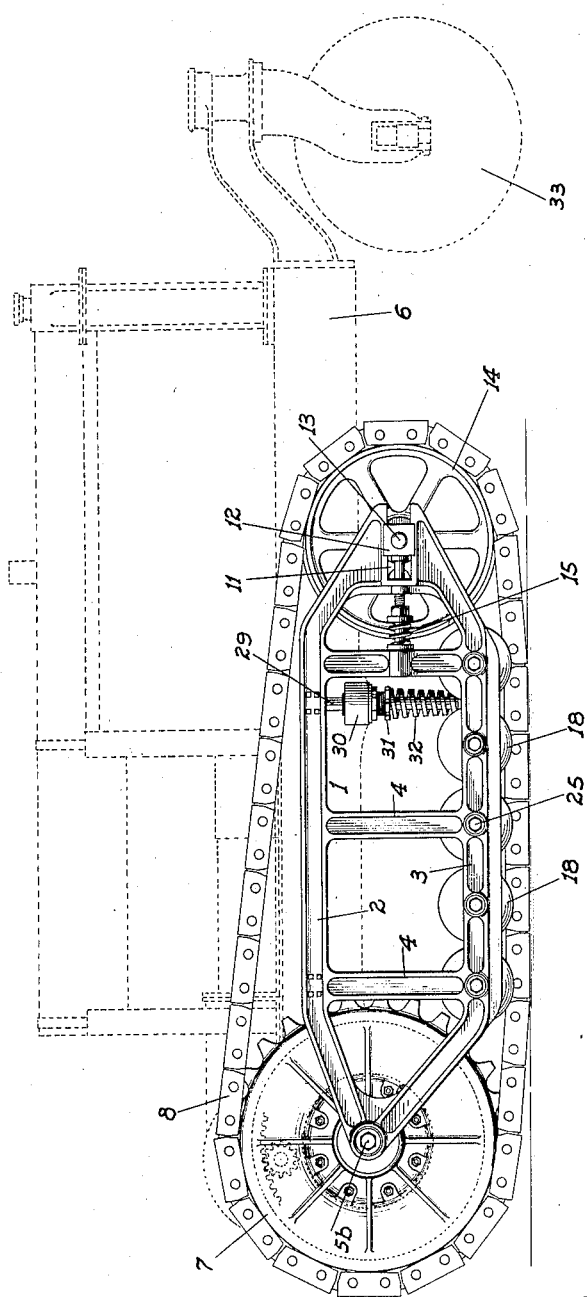
Fig. 1 is a side elevation of my improved track frame, showing the same attached to a tractor.

Referring now more particularly to the characters of reference on the drawings, the numeral 1 denotes the frame members of which there are a spaced pair on each side of the tractor, each pair and the parts connected to and coacting therewith forming a separate and independent unit from the other pair.

Each frame member is in the form of a truss, and consists of longitudinal upper and lower beams 2 and 3 respectively connected by vertical braces 4, the beams beyond the braces converging toward each other at each end. These frame members are each constructed as an integral unit, being preferably a steel casting, thereby providing great rigidity with a minimum of weight and eliminating the use of a quantity of rivets or bolts in their make-up. The rear ends of each pair of frames are connected and spaced at their points of convergence by a tubular sleeve 5, through which is adapted to pass the supporting axle $5^a$ common to the frames on both sides of the tractor, and mounted in the body 6 thereof.

A sprocket wheel 7 is turnably journaled on the sleeve 5, being adapted to receive thereon the track link structure 8, this latter being preferably of the type shown in my copending application for patent filed Nov. 25, 1919, Serial No. 340,494. Transverse beams 9 and 10 connect the beams 2, being positioned near their rear and forward ends respectively.

The front converging ends of each frame unit are provided with a longitudinal slot 11 in which rides a block 12 in which is journaled the shaft 13 of an idler wheel 14 over which the track 8 passes. Spring means 15 mounted to each of the frame members act against the blocks 12 to force the same forward and keep the track in flexible tension.

Secured in the lower frame beams 3 and extending between the same are a plurality of evenly spaced hollow and rigid shafts 16. These shafts act as spacers for the beams, since they are shouldered at their connection with the beams 3, as shown at 17. On each shaft is turnably mounted a pair of idler rollers 18, spaced apart transversely and adapted to support the track structure thereunder. These rollers are each provided with a pair of spaced bushings 19 which bear against the shaft, so that a central pocket 20 is provided between the shaft, the rollers and the bushings. Holes 16ª in the shaft 16 provide communication between the pockets and the interior of said shaft.

A bar 21 extends lengthwise of the beams 3 between each pair of rollers and is provided with bosses 22, each one of which is mounted on a shaft 16. Grease cups 23 are provided in each boss, and communicate with the interior of the shafts 16 through holes 24.

Cap screws 25 are screwed into each end of each shaft, thus enclosing the ends, and have washers 26 bearing against the outer faces of the beams 3, so that the beams cannot separate.

By means of this construction, each pair of rollers may receive an adequate supply of lubricant for their bearings with the shaft, since the hollow shaft may be filled either by removing one of the screws 25, or through the grease cup.

The forward transverse beam 10 is provided with a central vertically bored boss 27 and the bar 21 with a similar boss 28 in vertical alinement therewith.

A stout rod or shaft 29 extends between the two, and is rigidly fixed therein. A bracket 30 secured to and projecting from the body 6 of the tractor surrounds the shaft 29 adjacent its upper end, in which bracket is secured an adjustable sleeve 31 likewise surrounding the shaft 29 and spaced somewhat therefrom. A helical spring 32 is positioned on said shaft, extending between the sleeve 31 and the boss 28 on the bar 21.

By reason of this construction the frame units may move in a vertical plane about the rear axle 5ª as a fulcrum, such movement being limited by the tension of the spring. Thus a very flexible device is had, as the track bearing frame on either side is flexibly connected independent of that on the other side, and so permitting the tractor to pass over uneven ground with a minimum tendency to side-twist and strain the tractor body and its connected parts.

In the event that it is necessary or desirable to remove the track bearing unit it is only necessary to remove the vertical shaft 29, remove the holding nut 5ᵇ on the end of the axle 5ª, and pull out the entire unit by a sideways movement without otherwise dismantling the tractor. Ordinary wheels may then be mounted on the common axle 5ª.

Should it be desired to remove the front pilot wheel 33 of the tractor, the adjustable sleeve 31 may be screwed down so as to take up all the play ordinarily permitted the spring 32, in which event this connection then becomes a substantially rigid connection and the tractor may be operated with the endless track structure as its sole means of support.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. In a track supporting structure for tractors having a pair of spaced frames, a plurality of shafts secured to and between the frames adjacent their lower edges, a pair of spaced rollers turnably mounted on each shaft, and a rigid bar between the rollers and connecting all the shafts, whereby additional support for the latter is had and the rollers are maintained in spaced relation.

2. In a track supporting structure for tractors having a pair of spaced frames, a plurality of tubular shafts secured between the frames along their lower edges, a pair of spaced rollers turnably mounted on each shaft and adapted to ride on a track passing thereunder, a bar between the rollers and connecting all the shafts, a grease cup in the bar adjacent each shaft, and means for lubricating the bearing surfaces of both rollers with the shaft from the corresponding grease cup.

3. In a track supporting structure for tractors having a pair of spaced frames, a plurality of tubular shafts secured between the frames along their lower edges, a pair of spaced rollers turnably mounted on each shaft and adapted to ride on a track passing thereunder and a bar between the rollers and connecting all the shafts, a grease cup in the bar adjacent each shaft, and having communication with the interior of the tubular shaft, the same being enclosed at both ends, and a pair of spaced bushings in each roller bearing on the shaft, whereby an enclosed pocket is formed thereby, the shaft being provided with holes communicating with said pockets.

In testimony whereof I affix my signature in presence of a witness.

WALTER C. MATTESON.

Witness:
BERNARD PRIVAT.